US008595051B2

(12) United States Patent
Below et al.

(10) Patent No.: US 8,595,051 B2
(45) Date of Patent: Nov. 26, 2013

(54) METRICS CAPABILITY SELF ASSESSMENT

(75) Inventors: Paul A. Below, Poulsbo, WA (US);
Debra L. Maschino, Davison, MI (US);
Sanjay Kumar, Troy, MI (US); Lynne L. Palmer, Flower Mound, TX (US);
Dorothy J. Easterday, Poulsbo, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2630 days.

(21) Appl. No.: 10/745,989

(22) Filed: Dec. 24, 2003

(65) Prior Publication Data

US 2005/0144592 A1 Jun. 30, 2005

(51) Int. Cl.
*G06Q 10/00* (2012.01)

(52) U.S. Cl.
USPC .......................................... 705/7.38; 705/7.39

(58) Field of Classification Search
USPC .......................................... 705/10, 7.38, 7.39
See application file for complete search history.

(56) References Cited

U.S. PATENT DOCUMENTS

| | | | | |
|---|---|---|---|---|
| 5,903,453 A | * | 5/1999 | Stoddard, II | 700/79 |
| 6,161,101 A | * | 12/2000 | Guinta et al. | 706/45 |
| 7,478,053 B2 | * | 1/2009 | Dietz et al. | 705/10 |
| 2004/0230463 A1 | * | 11/2004 | Boivin | 705/7 |
| 2004/0243437 A1 | * | 12/2004 | Grace et al. | 705/2 |
| 2005/0097517 A1 | * | 5/2005 | Goin et al. | 717/124 |
| 2007/0282664 A1 | * | 12/2007 | Monster | 705/10 |

OTHER PUBLICATIONS

Chen, A. eWeek "Customer Feedback Key for Theme Park", vol. 20, Issue 50, p. 58, Dec. 15, 2003.*

* cited by examiner

*Primary Examiner* — Mark A Fleischer

(57) ABSTRACT

A method, system, and computer program product for systematically collecting metrics implementation data for use by an enterprise. A metrics capability self assessment (MCSA) system determines a set of information sections important in evaluating implementation of metrics for an organization within the enterprise. The MCSA system also determines a set of questions to measure the degree of implementation of metrics within each information section. The MCSA system then presents the questions to each organization and project site within the organization on a periodic basis to ensure a systematic collection of information. Based on the answers, a scale is assigned to each group site or project site within the organization, wherein the scale provides a simple means of determining the level of metrics implementation of a group. Responses from the various project sites and organization sites may then be grouped into statistical information for presentation to a user.

13 Claims, 12 Drawing Sheets

Abbreviations on the table: NA = Not Applicable, NDR = No Data Received

| Delivery Group/ Region/ Site | CMM Level | Q3 2002 | | Q4 2002 | | Q1 2003 | | Q2 2003 | | Stage Change from last quarter |
|---|---|---|---|---|---|---|---|---|---|---|
| | | Total | Stage | Total | Stage | Total | Stage | Total | Stage | |
| Client Proximity Delivery | | | | | | | | | | |
| Canada Delivery | | | | | | | | | | |
| Alberta | 1 | 8 | 2 | 15 | 4 | 18 | 4 | 20 | 4 | 0 |
| British Columbia | 1 | 3 | 1 | 7 | 2 | 5 | 2 | 6 | 2 | 0 |
| Central Ontario | 1 | 9 | 2 | 16 | 2 | 21 | 4 | 21 | 4 | 0 |
| Durham | 3 | 20 | 4 | 20 | 4 | 24 | 6 | 24 | 6 | 0 |
| Manitoba | 1 | 5 | 2 | 14 | 3 | 14 | 3 | 14 | 3 | 0 |
| NCR – Ottawa | 1 | 16 | 2 | 17 | 2 | 15 | 2 | 15 | 2 | 0 |
| NDC – Ottawa | 3 | 22 | 4 | 23 | 4 | 25 | 6 | 25 | 6 | 0 |
| Quebec & Atlantic | 1 | 3 | 1 | 8 | 2 | 8 | 2 | 10 | 2 | 0 |
| Saskatchewan | 1 | 4 | 1 | 7 | 2 | 8 | 2 | 9 | 2 | 0 |
| South West Ontario | 1 | 1 | 0 | 8 | 2 | 10 | 3 | 11 | 2 | -1 |
| US Central Delivery | | | | | | | | | | |
| Chicago | 3 | 20 | 4 | 20 | 4 | 20 | 4 | 20 | 4 | 0 |
| Heartland | 2 | 11 | 3 | NDR | NDR | NDR | NDR | 5 | 2 | NA |
| Indianapolis | 3 | 24 | 6 | 25 | 6 | 21 | 4 | 24 | 4 | 0 |
| Lansing | 3 | 25 | 6 | 25 | 6 | 25 | 6 | 25 | 6 | 0 |
| Mid Michigan | 3 | 22 | 5 | 22 | 5 | 23 | 5 | 25 | 6 | +1 |
| Minneapolis | 3 | 24 | 6 | 22 | 5 | 22 | 5 | 23 | 5 | 0 |
| Northeast Ohio | 2 | 20 | 4 | 20 | 4 | 20 | 4 | 21 | 5 | +1 |
| South Central Ohio | 2 | 17 | 4 | 17 | 4 | 17 | 4 | 18 | 4 | 0 |
| Southeast Michigan | 2 | 24 | 6 | 24 | 6 | 24 | 6 | 24 | 6 | 0 |
| US East Delivery | | | | | | | | | | |
| Atlanta | 2 | 14 | 3 | 15 | 4 | 15 | 4 | 15 | 4 | 0 |
| Boca Raton | 2 | 16 | 4 | 18 | 4 | 18 | 4 | 19 | 4 | 0 |
| Carolina | 3 | 16 | 4 | 16 | 4 | 17 | 4 | 18 | 4 | 0 |

| Category | Question | Level 1 %yes | Level 2 %yes | Level 3 %yes |
|---|---|---|---|---|
| Project | 1: project metrics procedures | 46 | 92 | 80 |
| | 2: project metrics contact | 76 | 100 | 83 |
| | 3: metrics used for top-down estimates | 20 | 85 | 80 |
| | 4: metrics used for bottom-up estimates | 17 | 77 | 77 |
| | 5: defect metrics (most projects) | 52 | 92 | 77 |
| | 6: change metrics (most projects) | 52 | 85 | 80 |
| Training | 7: Basic Measurement and FP Overview | 15 | 69 | 57 |
| | 8: metrics standards | 30 | 54 | 67 |
| | 9: estimating process overview | 20 | 62 | 57 |
| | 10: metrics plan (project and organization) | 48 | 100 | 80 |
| Site Infrastructure | 11: PreSage implementation | 52 | 85 | 80 |
| | 12: time tracking tool implementation | 80 | 92 | 83 |
| | 13: site FP SME | 39 | 69 | 83 |
| | 14: use of MEC or local metrics team | 65 | 85 | 83 |
| | 15: document organizational metrics use | 35 | 46 | 70 |
| Site Process – Basic | 16: effort standards | 61 | 92 | 83 |
| | 17: FP process | 24 | 69 | 70 |
| | 18: staff, duration, estimate standards | 69 | 85 | 83 |
| Site Process - Advanced | 19: defect metrics (all) | 19 | 46 | 70 |
| | 20: change metrics (all) | 19 | 54 | 63 |
| Reporting and Use | 21. management oversight of projects | 57 | 69 | 77 |
| | 22. post project metrics report | 6 | 23 | 50 |
| | 23. site metrics reviewed | 31 | 31 | 67 |
| | 24. site metrics reports | 24 | 38 | 63 |
| | 25. measures for continuous improvement | 13 | 15 | 37 |

METRICS CAPABILITY SELF ASSESSMENT

BACKGROUND OF THE INVENTION

1. Technical Field

The present invention relates generally to information technology and, more particularly, to implementation of metrics to measure performance.

2. Description of Related Art

Information Technology (IT) is the broad subject concerned with all aspects of managing and processing information, especially within a large organization or company. The information managed may be any type of information, but often includes business processes such as, for example, inventory management, invoicing, and accounting. Sometimes, IT is referred to as Information Services (IS) or Management Information Services (MIS). Computers and related technology are central to information management.

Many types of entities, ranging from large and small corporations to universities, require IT services. IT often requires the integration of hundreds or thousands of networked computers and many different types of application software and databases, sometimes running in different operating environments. Each piece of the system may be responsible for a different element of a business function. For example, one suite of application programs may be responsible for inventory management while another suite of application programs is responsible for billing and accounting functions within a company. However, because inventory, billing, and accounting are not completely autonomous functions, there must be some amount of integration between the application software to, at the very least, allow or sharing of some data between application suites.

Often, because of the complexities involved in providing large scale IT services, IT services are often outsourced to or provided by an outside company with specific expertise in IT. This outsourcing of IT services may be a significant operating expense for a company and the availability or unavailability of services may also significantly impact a companies revenue streams in various areas of operation. For example, some of the IT services provided by an IT provider may impact billing within one line of business for the company while other IT services may impact inventory within a different line of business for the company. Therefore, in order to ensure greater profits, companies desire to have a measure of the impact of IT upon their business in a manner that allows them to make appropriate business decisions.

Furthermore, software organizations within an IT provider need to implement measurement (metrics) programs in order to collect, validate, store, analyze and report operational measures to determine whether they are meeting Level of Service agreements and other operational measures associated with the provision of IT goods and services. This requires the implementation of metrics processes. Leaders of groups within an IT provider also need a way to quickly determine the current status of the metrics implementation, identify locations that need assistance, and determine if progress is being made. Individual locations needed an inexpensive method to determine their current status, and identify what their next and future steps should be so that they can develop plans.

Therefore, it would be desirable to have a method, system, and computer software product that aids IT providers in implementing metrics to determine, for example, further plans and steps in implementing an IT service or project for a client.

SUMMARY OF THE INVENTION

The present invention provides a method, system, and computer program product for systematically collecting metrics implementation data for use by an enterprise. In one embodiment, a metrics capability self assessment (MCSA) system determines a set of information sections important in determining implementation of metrics in an organization within the enterprise. The MCSA system also determines a set of questions for each information section which measure the degree of implementation of metrics within a given one of set of information sections. These are typically determined by a group within the enterprise and entered into the MCSA system. The MCSA system then provides a user with the set of questions and receives responses to the set of questions. These questions are presented to each organization and project site within the organization on a periodic basis to ensure a systematic collection of information. Based on the answers, a scale is assigned to each group site or project site within the organization, wherein the scale provides a simple means of determining the level of metrics implementation of a group. Responses from the various project sites and organization sites may then be grouped into statistical information for presentation to a user. The information can be used either statistically or in raw form by a user to make plans and changes in metric systems to enable the enterprise to become more efficient and make better use of metrics.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5-12 depict various exemplary tables, graphs, and reports of MCSA data that may be presented to a user to aid an enterprise in determining the metrics capability of the enterprise and implementation of metrics throughout the enterprise.

DETAILED DESCRIPTION OF THE PREFERRED EMBODIMENT

Figure 1:
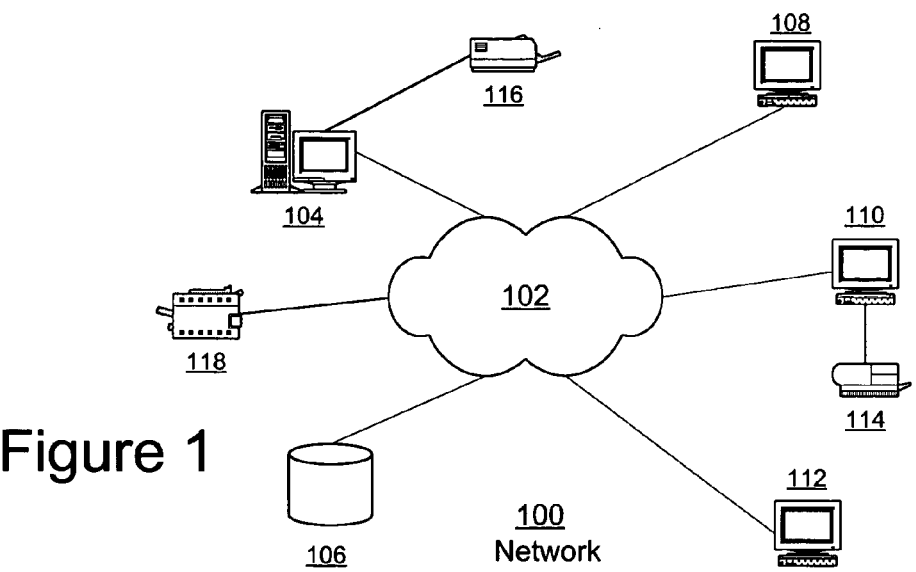
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is a private Internet, with network 102 representing an enterprise wide collection of networks and gateways that use the TCP/IP suite of protocols to communicate with one another. At the heart of the private Internet is a backbone of high-speed data communication lines between major nodes or host computers consisting of hundreds or thousands of computer systems that route data and messages. Of course, distributed data processing system 100 also may be implemented as a number of different types of networks such as, for example, an intranet, a local area network, a wide area network, or a virtual private network (VPN) implemented across the public Internet.

Users may use a client computer, such as, for example, any one of clients 108-112 to enter metric data into a Metrics Capability Self Assessment (MCSA) form provided by server 104. A metric is typically a measurement, usually numerical, of the accuracy or level of service of software, hardware, or a service provided by the enterprise and may be related to specifications within a level of service agreement between the enterprise and a customer. The MCSA provides questions that should be answered by various departments, groups, and organizations within an enterprise, such as for example, an Information Service (IS) provider, to aid in implementing metrics to measure and determine whether various departmental, group, organizational, and site goals are being implemented. The MCSA forms are used to enter and gather data about an organization's metrics capability as defined by a standard set of questions and the number of positive responses. The information collected through the MCSA form is stored on data base 106. The information is typically entered on a periodic basis, for example, quarterly, by each group, department, or organization within an enterprise. Furthermore, typically separate data is typically entered for each location or site within a department, group or organization within an enterprise. However, the granularity of data entry (e.g., whether data is entered for a local, regional, or national basis; or whether data is entered for a each group within a department or on a departmental basis) may vary depending upon implementation and is determined by the level of granularity that a particular enterprise requires in implementing its specific business objectives.

A stage score is calculated based on the number of yes responses to the MCSA questions. The stage score will be calculated and displayed only if all questions are answered, thereby ensuring adherence to the standardized assessment enterprise wide. If all questions are not answered, a message will be displayed explaining that all questions need to be answered. The stage score will only be stored on database 106 when the updater has answered all questions and submits the answers by selecting a submit button. The sum of total answers may be stored for an MCSA reporting period and may or may not be stored on the database, depending on implementation. The MCSA form may be saved with a status of "in-work" without all the required form fields being entered, allowing the updater to take the time needed in order to accurately answer all questions.

The MCSA questions are created and maintained by a group within the enterprise. A typical MCSA question form may contain the following sections: Header Section, Project Section, Training Section, Infrastructure Section, Process Section, and a Reporting and Use Section. Each section will contain a set of questions that must be answered about that section. These sections identify key main areas identified by an enterprise that are critical in implementing a metric for a group within the enterprise. The number and type of sections included in an MCSA form may vary depending on the needs of the particular enterprise implementing the present invention.

The header section for the MCSA primarily identifies the site for which the data is being entered and the time period, such as quarter, for which it is being reported.

The project section displays questions related to site managed projects for the reporting period. These project questions focus on site/centre managed projects having documented metrics procedures, having a contact for metrics collection, estimating and collecting defect and change metrics.

The training section form displays questions related to a site's metrics and estimating training of the organization's staff for the reporting period. These questions focus on project managers and project team members receiving basic metrics and estimating training.

The infrastructure section form displays questions related to a site's ability to obtain accurate metrics and store those metrics in a repository for the reporting quarter. These questions focus on the site to have a repository to store metrics, a time tracking system to collect effort, a Function Point Subject Matter Expert (SME), metrics support personnel and documented uses for project-relates metrics defined by organizational leaders.

The process section form displays questions related to the accuracy and consistency of the metrics collected at the site for the reporting quarter. These questions focus on the metrics collected using the standard definitions as defined in the Metrics Standards and Guidelines maintained by an Enterprise Applications Metrics Manager, function points counts done or audited by FP SMEs, and whether every site managed project is collecting defect and change metrics.

The reporting and use section form displays questions related to the review and use of metrics collected by the site for the reporting quarter. These questions focus on management oversight of projects with the review and use of metrics, creating post project reports from the metrics collected for site managed projects, reviewing and discussing site metrics on a regular basis, site leaders receiving metrics reports on a regular basis to meet their requirements as they defined earlier, and whether the site uses the measures they have for continuous process improvement.

Before the answers to the MCSA form being updated by an updater are accepted, they are submitted to an approval process. Most validation of answers is performed at the individual section level where relational integrity is maintained, alpha and numeric edits are enforced, and required fields are mandated. During the approval process, the approver looks more at the relationships between the answers to make sure that they are answered with the proper intent and are not contradictory to each other or that variations are documented in the comments. Previous time periods' data should be analyzed to uncover any radical changes.

The approver should review the MCSA time period for the update and ensure that this time period has been entered and is unique within the organizational metrics. The authorized approver should also validate that the questions are answered fairly consistently with the previous time period answers and check out significant inconsistencies by asking the Site Metrics SMEs/updaters how they answered the question and clarify the intent of the question if there is misunderstanding.

If it is determined that an MCSA form is inaccurate, it may be deleted. There are no specific edits performed prior to the deletion of an MCSA. The approver should review the form, and the reason for the deletion request to ensure that the deletion is valid and necessary. Deleting MCSA data is a logical delete until approved by an approver.

FIG. 1 is intended as an example and not as an architectural limitation for the processes of the present invention.

Figure 2:
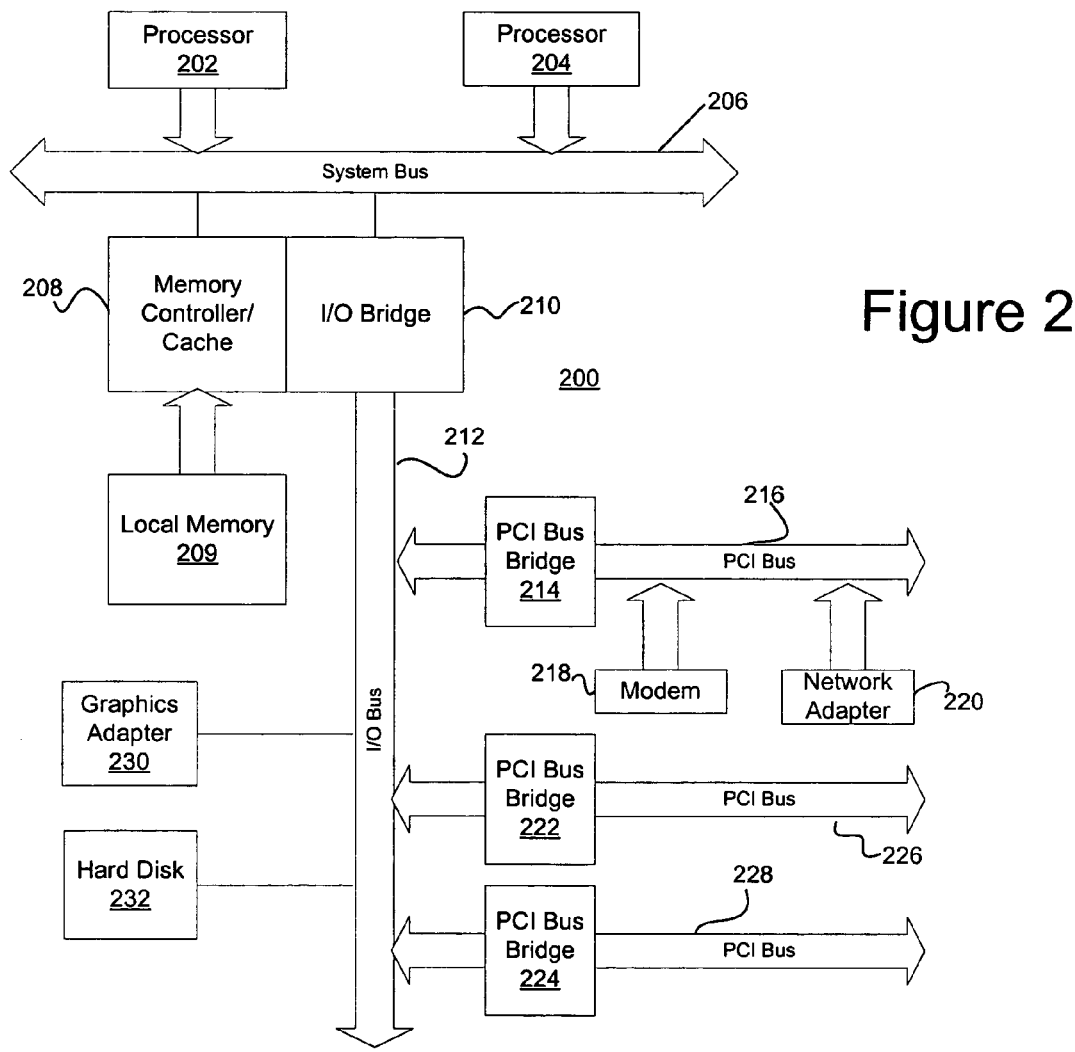
FIG. 2 depicts a block diagram of a data processing system which may be implemented as a server is depicted in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems such as modem 218 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries.

Data processing system 200 provides MCSA forms to users, collects MCSA results, and stores the results to a database. Data processing system 200 also creates tables, graphs, and reports based on the MCSA data and presents to users as requested.

Figure 3:
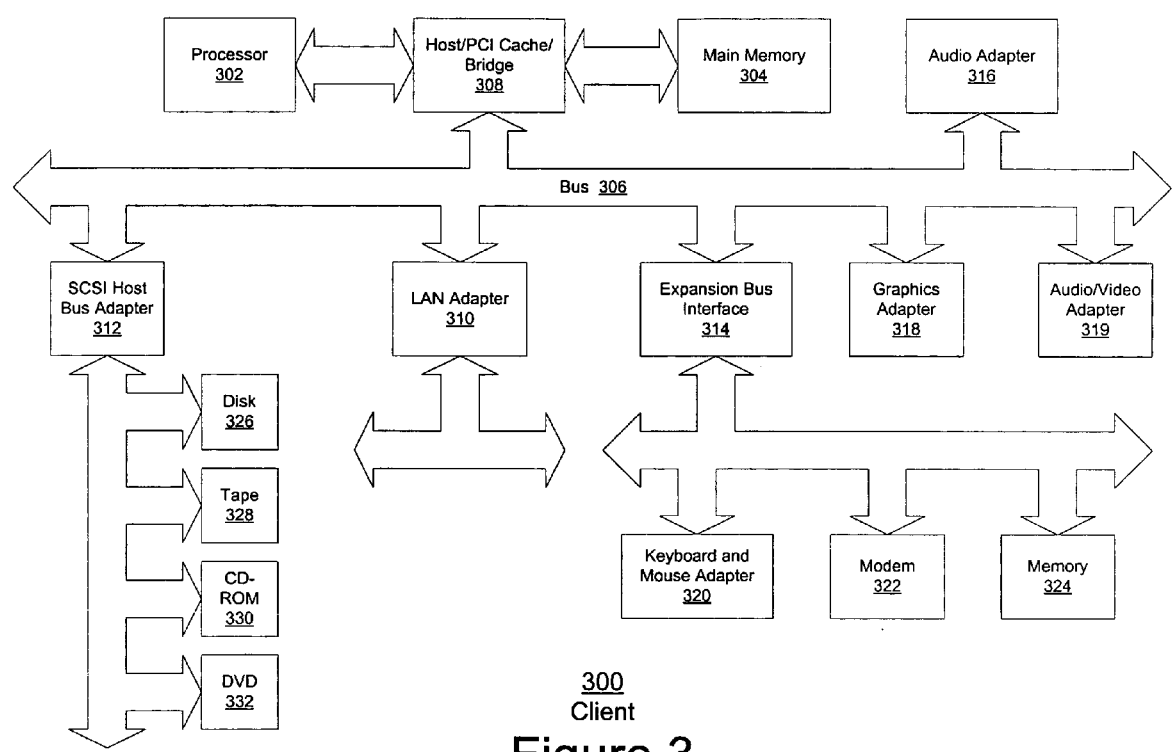
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Data processing system 300 may be used to input data into an MCSA form provided by a server or to view graphs, tables, and reports generated from MCSA data.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4A:
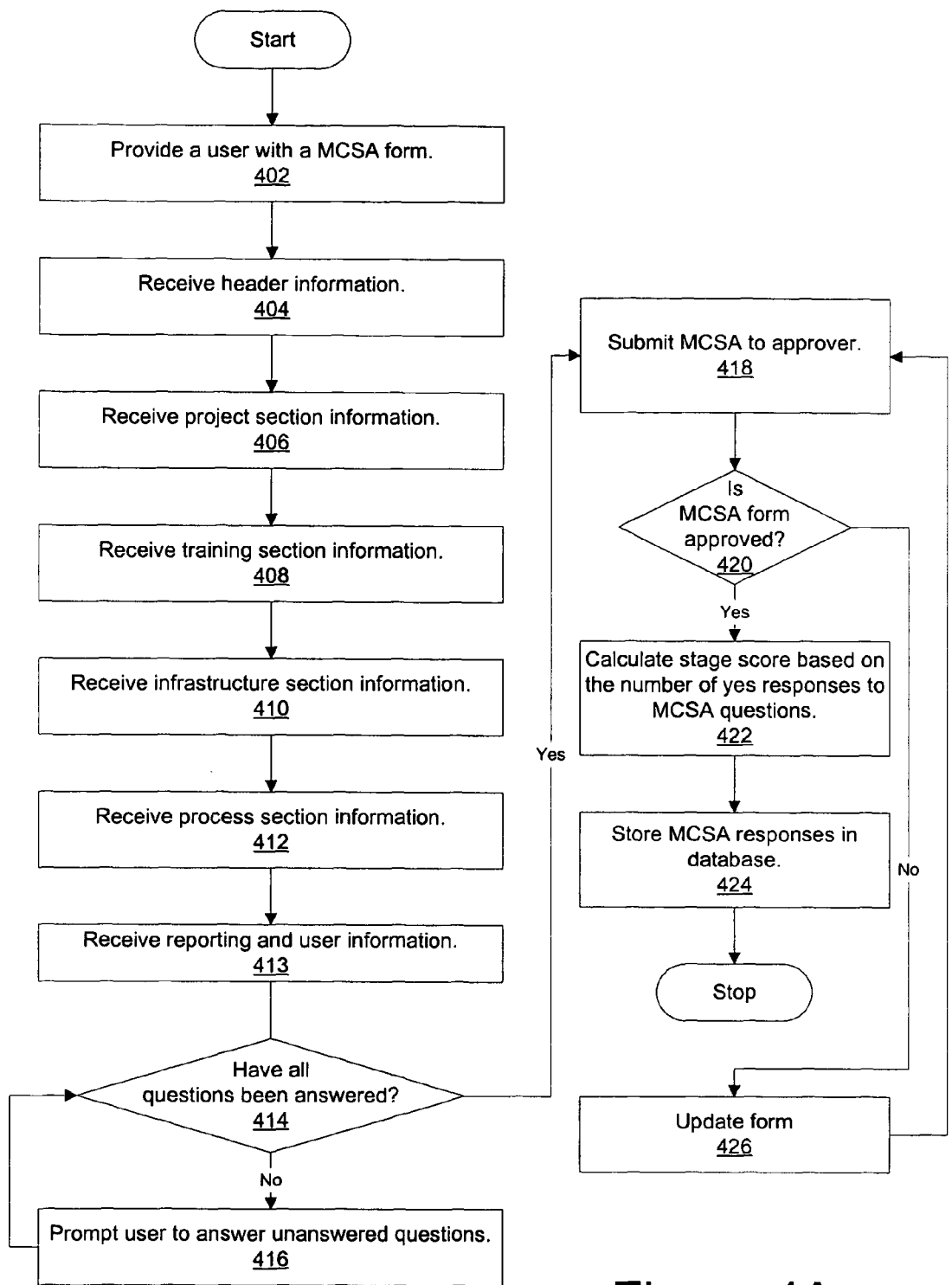
FIG. 4A, a diagram illustrating an exemplary process flow and program function for entering and approving MCSA data is depicted in accordance with one embodiment of the present invention.

With reference now to FIG. 4A, a diagram illustrating an exemplary process flow and program function for entering and approving MCSA data is depicted in accordance with one embodiment of the present invention. A user is provided with an MCSA form (step 402) and the MCSA system receives header information from the user (step 404). The header information may include such items as department, project, time period, and site location. The MCSA system then receives project section information (step 406). Project questions may include: 1. Does every site-managed project have documented metrics procedures either included in their project plan or included in the organization's metrics process? 2. does every site-managed project have a designated contact for metrics collection? 3. Are the collected enterprise metrics used as input into top-down estimates for site-managed software projects of sufficient size to use the estimating process? 4. Are the collected metrics used as input into bottom-up estimates for site-managed projects? 5. Does the organization collect defect metrics for most site-managed projects following the enterprise definition? 6. Does the organization collect change metrics for most site-managed projects following the enterprise definition?

For question 1, text indicating the minimum required items for answering yes may be included and may be the following: "the primitive metrics and data elements that will be collected, the frequency with which each primitive metric will be collected, the way in which the metrics will be stored and/or transmitted (including storage medium), and designation of a project metrics contact in the roles and responsibilities section of any applicable project documents. The project plan should refer to the organization plan for description of standard metrics processes that the project is using. The project plan may also include any project-specific metrics as well as any project-specific metrics processes. Projects should each have their own measurement plan or say they are using the organization measurement plan providing it includes the necessary information for projects. The measurement plans may or may not include metrics procedures."

For question 2, the instructions for answering yes may include text indicating that "the designated contact may be the project manager, or it may be a project member designated by the project manager. The contact must be identified in the project documentation as well as communicated to a Site Metrics SME."

For question 3, the form may include the following information to aid the updater in answering the form questions. "To answer yes, the organizational estimating process must call for the user of historical data, e.g., size, effort, as input for project estimates and the projects must use the local estimating process. The estimating process must specify that estimates are documented, reviewed, and agreed to by the project team. For example, the use of an estimating center, which uses a top-down estimating tool containing industry data, will meet the requirement for this question if the estimating center or project team uses historical metrics to reconcile or calibrate the tool's results. The historical metrics can either by submitted to the estimating center from an organizational repository or can be collected by the project team."

For question 4, the following information may be provided to the updater illuminate the question. "To answer yes, the organizational estimating process must call for the user of historical data as input for project schedules and bottom-up estimates and the projects must use the local estimating process. The estimating process or project management process must specify that estimates are documented, reviewed, and agreed to by the project team."

For question 5, the following text may be provided to the updater to aid in answering the question. "To answer yes, more than half of the production support projects must be collecting defects during production and more than half of all software projects must be collecting defects during their life cycle. To meet this requirement, the defects must be entered into at least one of the following: a project or site level defect tracking system or PreSage monthly summary.

The MCSA system then receives training section information (step 408) which may be, for example, answers to the following questions: 7. For every site-managed project, has the project manager and project metrics contact received training in Basic Measurement, and has every software project manager and software project metrics contact received an overview of Function Point analysis? 8. Have all team members assigned to site-managed projects received training in the definitions and standards for metrics collection? 9. Has every software project manager received an overview of the estimating process used by the enterprise estimating centers? Has very project manager received training or coaching in the creation of a project metrics plan from a Metrics SME and does every project manager have an understanding of the organizational plan for metrics?

For question 7, the following text may be provided to the updater to aid in answering the question. "For sites that do not use Function Points, the second class can be replaced with overview training on the site's size measure if the Enterprise application—Metrics Group has reviewed the training material."

For question 8, the following text may be provided to the updater to aid in answering the question. "Training includes the definitions for all the required primitive metrics, as well as the standards and procedures for reporting the metrics."

For question 9, the following text may be provided to the updater to aid in answering the question. "This question applies only to project managers assigned to software projects large enough to use the estimating centers. For a list of the Enterprise estimating centers, refer to the Metrics web pages. An example of the overview is the presentation done by a representative from one of the estimating centers. The overview should cover such things as: the process a project uses to work with an estimating center, the services provided by an estimating center, example of the estimating process, explanation of the ways the estimating process helps the enterprise. Sites with no software projects or software projects that are too small to use the estimating center can answer this question yes if hey have an estimating process and the project managers have received training in the user of the process that covers the items listed above."

For question 10, the following text may be provided to the updater to aid in answering the question. "To answer yes, an organization must provide either training or coaching to every leader of the site-managed projects. Training is not required if the coaching occurs during project start-up for every site-managed project. Project managers who have received training or coaching in the creation of a project metrics plan for a previous project need not receive new training or coaching; however, a Site Metrics SME must review the project metrics plan."

After receiving the training section information, the, the MCSA system receives infrastructure section information (step 410). This information is received in the form of answers to questions presented in the MCSA form infrastructure section. These questions may include, for example: 11. Are the required metrics for every site-managed software project being placed into the organization's metrics repository? 12. Has the organization implemented a time tracking system? 13. Has at least one Function Point SME been identified for each site? 14. Does the organization either use an external metrics group or have a local metrics team that conducts metrics validation, storage, and reporting? 15. Have the organizational leaders defined and documented their uses for project related metrics, and implemented a process to maintain the document?

For question 11, the following text may be provided to the updater to aid in answering the question. "Intent: All site-managed software projects using the appropriate site process, e.g., GSMS or SSP, must be entering current metrics into PreSage. Compliance Indicators: Each required active or on-hold software project must have all applicable registration, environmental characteristics, estimate, and monthly metric periods up to and including the most current reporting period, approved in PreSage by the second MCSA reporting date following the project's registration. Closed projects must be closed in PreSage within 3 months of the end of the post-implementation phase (4 reporting periods, inclusive).

Example Scenarios:
1. A site has PM responsibility for a software project undergoing a Project Manager change and hasn't had metrics entered for the last 2 months. This is a NO.
2. A site has PM responsibility for 2 (of 12) software projects which are NOT using the site's process. These projects do not collect metrics. All other projects have all metrics currently entered into PreSage. This is a NO or YES, depending on whether it was decided to not use the site process due to too much work (answer NO) or the process doesn't makes sense to use on a project for justified business reasons (answer YES).
3. A site has 10 software projects (5 PS and 5 Development +) managed using the site process. All 10 projects have all required metrics reported for the current period (providing the Development + projects are in the Define phase). This is a YES."

For question 12, the following text may be provided to the updater to aid in answering the question. "Implemented implies that the time tracking system is used consistently across the entire organization to collect effort data, and the effort data is used for project tracking. Also, summarized effort metrics stored in a metrics repository are collected using this standard time tracking system.

Intent: The organization is using a time tracking system, such as Innate Timesheetsä, PIV time tracking or EDS ES (SAP time tracking), to capture effort hours on all site-managed projects using the organizational process. All resources entering time have a common understanding of how to report effort into the appropriate tasks/categories.

Compliance Indicators: A single time tracking system is implemented and used according to organizational processes/procedures. Effort is entered appropriately for the reporting period by all centre staff and the managed project effort is entered into a metrics repository. For level 1 organizations, 85% of the timesheets are turned in on time for each month in the quarter. For Level 2 organizations, 90% of the timesheets are turned in on time and for level 3, 100% are turned in on time. On time is defined as within 24 hours of the due date.

Example Scenarios:
1. A common time tracking system is implemented at a site and is used by all site personnel on managed projects. This time tracking system provides the data needed for the managed projects to enter project effort into the metrics repository. However, staff augmented personnel use their business partner's or client's time tracking system as well. This is a YES.
2. A site has implemented a common time tracking system in 40% of the site. This is a NO.
3. A site has implemented a common time tracking system but many of the staff are entering 8 hours a day to their projects at the end of the reporting period. This is a YES or NO depending on whether the staff is actually working 8 hours a day on the project or not."

For question 13, the following text may be provided to the updater to aid in answering the question. "An 'FP SME' for purposes of this question is a person who either is an IFPUG CFPS or has been formally trained in FP analysis and has completed at least three FP counts (total duration exceeding one month). Identified means that the role and responsibilities of the FP SME have been communicated to all project teams. A site that uses size measures other than IFPUG FP can meet this requirement by replacing 'FP' with the site's size measure and replacing 'IFPUG CFPS' with size certification."

For question 14, the following text may be provided to the updater to aid in answering the question. "The *Information Manual* explains the roles and responsibilities of the local metrics team. A local metrics team must communicate with the project metrics contacts (as described in question 2)."

For question 15, the following text may be provided to the updater to aid in answering the question. "To answer yes, an existing document must be kept in a location that can be accessed by the Site or Regional Metrics SME as well as the organizational leaders. The organizational document may address measures other than software project metrics; the intent is for the organizational leaders to have documented their need for information, and to link the reported information to the business needs.

A process for maintaining the document as business needs change must be implemented. Review the GSMS processes around the Organizational Metrics Plan creation and review or contact your Regional SME or appropriate Central Metrics Team (Americas, EMEA or Asia Pacific) for information on creating and maintaining this document. Intent: The organization must demonstrate that the metrics collected are to be utilized in a beneficial way and that the leadership has planned for and expects this to happen. The metrics may be used in one or more capacities, including Process Improvement, Project Management, Decision Support, Business Planning, Customer Satisfaction, Work Management and others.

Compliance Indicators:
1. Documented plan exists for use of collected metrics supported by: Organizational Measurement Plan; Strategic Business Plan including tying metrics to business goals and initiatives; Minutes from planning meetings to produce the above documents.
2. Actual use of the metrics is planned, as indicated by: assignment of SMEs to learn metrics analysis, development of templates for this reporting to be able to take place, determining communication of the reports.
3. Documented process used to maintain Organizational Measurement Plan and Business Plan supported by: Process documents and templates; training materials; minutes from meetings to maintain the above documents.

Example Scenarios:
1. XXSC has a documented business plan with metrics associated with organizational goals which was created 3 years ago and has not been updated. This is a NO.
2. YYSC has an organizational measurement plan that has not been updated in two years. There is a process to create and update the measurement plan and there is evidence in the form of meeting minutes that the leadership is regularly reviewing local metrics reports. This could be a YES or NO depending on the SMEs familiarity with undocumented usage of metrics data.

3. ZZSC has an organizational measurement plan which was updated last year. The metrics SME meets regularly with the site leadership to discuss metrics reports. The SME is a regular attendee at the site PI meetings and is asked for metrics input regarding process and project performance as evidenced by PI meeting minutes. This is a YES."

After the site infrastructure question answers have been received, the MCSA system receives the site process section information (step 412). Questions for this section may include, for example, the following: "16. Was the effort data collected using the standards for effort and the definitions for project categories? 17. Is there an implemented process whereby either all function point (FP counts in the site are done by an FP SME or an FP SME routinely conducts random audits of FP counts that are performed by trained counters? 18. Does the organization collect metrics following the definitions for the required primitive metrics of staff, duration, and estimates? 19. Does the organization record and collect defect metrics for every site-managed project, following the enterprise definition? 20. Does the organization record and collect change metrics for every site-managed project, following the enterprise definition?

For question 16, the following text may be provided to the updater to aid in answering the question. "The standards are documented in the Effort Tracking section of the *Information Guidelines*."

For question 17, the following text may be provided to the updater to aid in answering the question. "An 'FP SME' for purposes of this question is a person who either is an IFPUG CFPS or has been formally trained in FP analysis and has completed at least three FP counts (total duration of counts exceeding one month). A site that uses size measures other than IFPUG FP can meet this requirement by replacing 'FP' with the Site's size measure and replacing 'IFPUG CFPS' with size certification."

For question 18, the following text may be provided to the updater to aid in answering the question. "The standards are documented in the Definitions section of the *Information Guidelines*."

For question 19, the following text may be provided to the updater to aid in answering the question. "To answer yes, all production support projects must be recording defects during system use, and all software projects must be collecting defects during conformance reviews in Define, Analysis, Define, Produce Optimize, Implementation and Post-Implementation. To meet this requirement, the defects must be entered into the following: a project or site level detailed defect tracking system and presage monthly summary.

For question 20, the following text may be provided to the updater to aid in answering the question. "To answer yes, all projects must be recording requirements changes during development. Production support collection change types are Defect Prevention, enhancement, Corrective Action, Run Time Improvement, and Architecture changes. To meet this requirement, the changes must be entered into the following: A project or site level change tracking system and PreSage monthly summary."

The MCSA system may then also receive reporting and use information (step 413). Questions associated with this section may include, for example, the following: 21. Does the site have an implemented process for management oversight of projects, including review of the project metrics and status on a regular interval (at defined project milestones and/or on a regular basis)? 22. Are the collected metrics used to create a post project metrics report for every site-managed project? (For site-managed production support projects, are the collected metrics used for a regular project report at least annually?) 23. Does the site review and discuss the site's collected metrics on a regular interval? 24. Do the site leaders receive reports on a regular basis that meet their current requirements for organizational project related metrics (as defined in question #15)? 25. Does the organization have an implemented process to use the measures for continuous process improvement?

For question 21, the following text may be provided to the updater to aid in answering the question. "To answer yes, there must be an implemented process whereby site leaders review the progress of projects. The site process for management oversight must include review of the project metrics reported-to-date compared to project estimate and schedule (project metrics compared to schedule and project history for production support projects that do not have an estimate). The project metrics reviewed must include all of the required metrics.

Intent: Site management (PCMs, Org Manager) must review project metrics and project progress. There must be a process that includes management review of project status and metrics.

Compliance Indicators: A process must exist and be reviewed on a periodic basis (preferably monthly) and updates made appropriately. The process must be used by site management for review of projects actuals to estimates and evidence shown of usage (minutes from management review meetings with PMs and/or Metrics SMEs).

Example Scenarios:
1. A centre has a process documented but management has not reviewed projects (status nor metrics) for 6 months. This is a NO.
2. A site has a process and management reviews projects on a regular basis but only the duration metric is reviewed. This is a NO.
3. A centre has a process for management reviews to regularly review status and required monthly metrics for all managed projects. This is a YES."

For question 22, the following text may be provided to the updater to aid in answering the question. "The post-project metrics report should compare the project's performance to similar historical EDS and/or industry projects. The post-project metrics report augments the project survey results, an SQA report, or other items.

To answer yes, the metrics report must be distributed to the project manager, to the project team members, to a Site or Regional Metrics SME, and to the site's Program Control Manager or business leader with responsibility for the project.

Intent: Every site managed project using the organization's processes must have a post project metrics analysis report completed and distributed to all affected parties, including the Site and Regional Metrics SMEs, of the project. NOTE: If no projects were closed for the quarter, the site should answer the same as in the previous quarter. If the site had a project close towards the end of the quarter and the opportunity exists to create the report (all required metrics are finalized), then the site should answer YES with the knowledge that the report will be created prior to the end of the next quarter.

Compliance Indicators: A Post Project Analysis (PPA) report is created, distributed to the necessary parties and stored in the project's workbook. This report must include the project data and other aggregated data from similar projects in EDS or the industry for comparison purposes. For production support projects, a report is created, distributed and stored, minimally annually. Minutes or memos from review meetings should be captured.

Example Scenarios:
1. A site has a project close and no PPA report is created although all metrics have been reported. This is a NO.
2. A site creates a PPA report for a closed project but it contains no comparison to data from similar projects. This is a YES if similar data was unavailable (doesn't exist), or a NO if there was no attempt made to find similar project data.
3. A production support project with an application that is sized has been in the metrics repository for over a year and has never had a metrics report created for it. This is a NO.
4. A project is closed, has all metrics reported and creates a PPA report with industry data and distributes it to all necessary parties. This is a YES."

For question 23, the following text may be provided to the updater to aid in answering the question. "To answer yes, there must be an implemented process whereby a Metrics SME regularly communicates metrics analysis to the site leaders. Examples of analysis includes:
Comparisons to historical data, including regional or organizational metrics
Comparisons to industry data
Examination of trends over time The analyzed metrics must include results from completed site-managed projects and ongoing site-managed production support at a minimum.

Intent: The metrics captured are analyzed and used according to a documented process. These metrics are reviewed with the site leadership, in a regularly scheduled meeting, minimally quarterly.

Compliance Indicators: Site leaders understand and use the metrics data. Analysis reports are created and reviewed with site leaders on a periodic basis in accordance with the implemented process. Minutes of such meetings are documented and may include business decisions made based on the data in the reports and action items for follow-up analysis.

Example Scenarios:
1. A site creates and stores metrics analysis reports on a shared server accessible by all site personnel. There is no process or evidence that leadership reviews these reports from the server. This is a NO.
2. A site creates metrics analysis reports and the Metrics SME attends quarterly site leadership meetings to review and discuss the reports. These reports are stored on a shared server. This is a YES."

For question 24, the following text may be provided to the updater to aid in answering the question. "To answer yes, question 15 must have been answered yes. Conversely, this question is answered no if the answer to question 15 is a no.

The reports used by the leaders may include metrics from other sites (such as the site's region) as appropriate, because there may not be enough project data generated at the site to meet the requirements for information.

Intent: Site leaders receive, on a regular basis, reports which corresponds to their specified requirements previously documented (see question 15). These reports are reviewed and understood by the site leaders.

Compliance Indicators: The reports generated are complimentary to the measures defined and documented previously. These reports can be in the form of a web page, PowerPoint presentation, MS Word document or Excel workbook to name a few. They are reviewed by site leaders and any questions, actions, decisions made based on the data are documented.

Example Scenarios:
1. Reports are created haphazardly due to the lack of Metrics SME resources and fluctuation in the number of managed projects and/or managed projects reporting metrics. This is a NO.
2. Reports are created and reviewed on a quarterly basis and decisions based on the data in the reports are documented. This is a YES."

For question 25, the following text may be provided to the updater to aid in answering the question.
"Examples Include:
Using defect metrics to identify common causes of defects and develop action plan for removing them.
Using change metrics to aid in the enhancement of a process for change management.
Using project metrics to evaluate and enhance a project management process, or to monitor project performance.
Using historical metrics to understand the site's current process performance
Using historical metrics to review the progress of the process changes or the impact of specific process changes
Implemented process implies that the organization uses the metrics on a regular and frequent basis, and that numerous examples similar to the above are observed behaviors."

The MCSA system then determines whether all of the questions in the MCSA form have been answered (step 414). If not, the MCSA system informs the user of this fact and may prompt the user to answer the unanswered questions (step 416). The user may decide to save the form as an in-progress form and come back to the form at a later time. If all of the questions in the MCSA form have been answered, then the MCSA answers are submitted to an approver (step 418. The approver's functions are described above with reference to FIG. 1. The MCSA system then determines whether the MCSA form answers have been approved (step 420) and if not, the form is represented to the updater to update the form (step 426) or may be deleted. If the MCSA form answers are approved, then the MCSA system calculates a stage score based on the number of yes response to the MCSA questions (step 422) and stores the MCSA responses in a database (step 424).

In one embodiment seven stages are defined: stages 0-6. Each stage corresponds to a different level of metrics implementation. Stage 0 —Metrics implementation has not begun. Stage 1 —Metrics implementation has started, but no consistent measurement is being used. Stage 2 —Metrics processes are partially implemented in the organization: some basic infrastructure exists to support tracking and storage of project data. Stage 3 —Metrics processes are partially integrated in site-managed projects: Use of a metrics repository and time-tracking tool is standardized across the site; Process integration is in less than 100% of site-managed projects and/or less than 100% of the required metrics are being collected. Stage 4 —Metrics processes are fully integrated in site-managed projects: Metrics reporting, based on data collected, is consistently performed on all site-managed projects; however, a few of the desired metrics are not being collected and/or used. Stage 5 —The required metrics processes are implemented: There is a focus on improving software development performance, estimates, and product quality based on quantitative data from historical databases on all projects. Stage 6 —The required metrics processes are implemented: Metrics are regularly used by both projects and the organization to improve processes and products; Metrics are used to drive business decisions, and there is a direct link between metrics and business measures; Metrics in addition to the required minimum are being collected and used.

In one embodiment, to assign a stage to a set of MCSA answers, the following correspondence between the number of "yes" responses to stage section is used: 0-1 "yes" responses is stage 0; 2-4 "yes" responses is stage 1; 5-9 "yes" responses is stage 2; 10-14 "yes" responses (must include "yes" answers to questions 11 and 12) is stage 3; 15-19 "yes" responses (must include "yes" answers to questions 11 and 12) is stage 4; 20-23 "yes" responses (must include "yes" answers to questions 1 through 4, 7 through 14, 16 through 18, 22, and 23) is stage 5; 24 or 25 "yes" responses (must include "yes" answers to questions 1 through 4, 7 through 14, 16 through 18, 22, and 23) is stage 6. It is important to note that if the number of yes answers indicate Stage 3 through Stage 6, but the additional criteria has not been met, then the stage is set to the next stage below. For example, if the number of yes answers is 14 and question 11 is a no answer, then the stage is 2.

In some embodiments, the MCSA forms are automatically presented to appropriate users periodically to ensure that data is collected from each organization and site within the enterprise in a periodic and timely manner to increase the efficiency of management of the enterprise. It should also be noted that the processes and steps presented in FIG. 4A are intended as an exemplary process for collecting MCSA information and are not intended as architectural limitations to the present invention. For example, the order in which information is collected is not important or crucial to the functioning of the present invention.

Figure 4B:
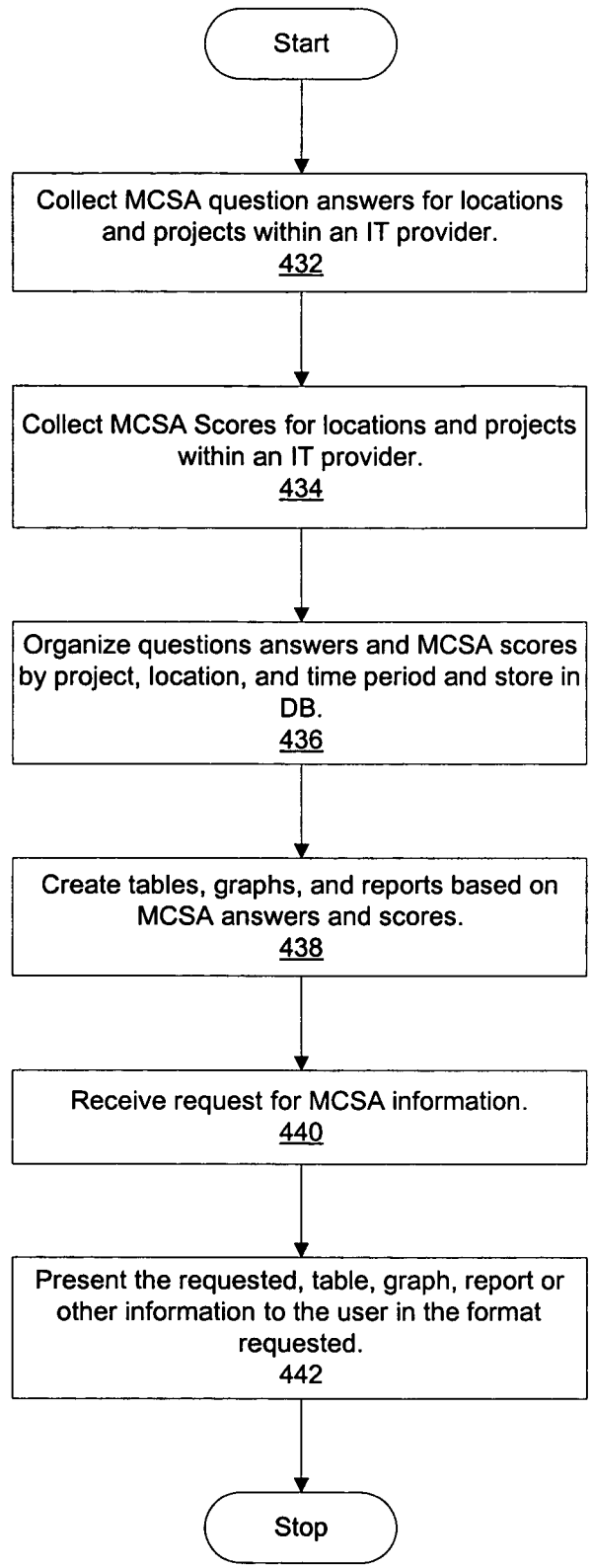
FIG. 4B depicts a diagram illustrating an exemplary process flow and program function for collecting, storing and organizing MCSA data in accordance with one embodiment of the present invention.
Figure 6:
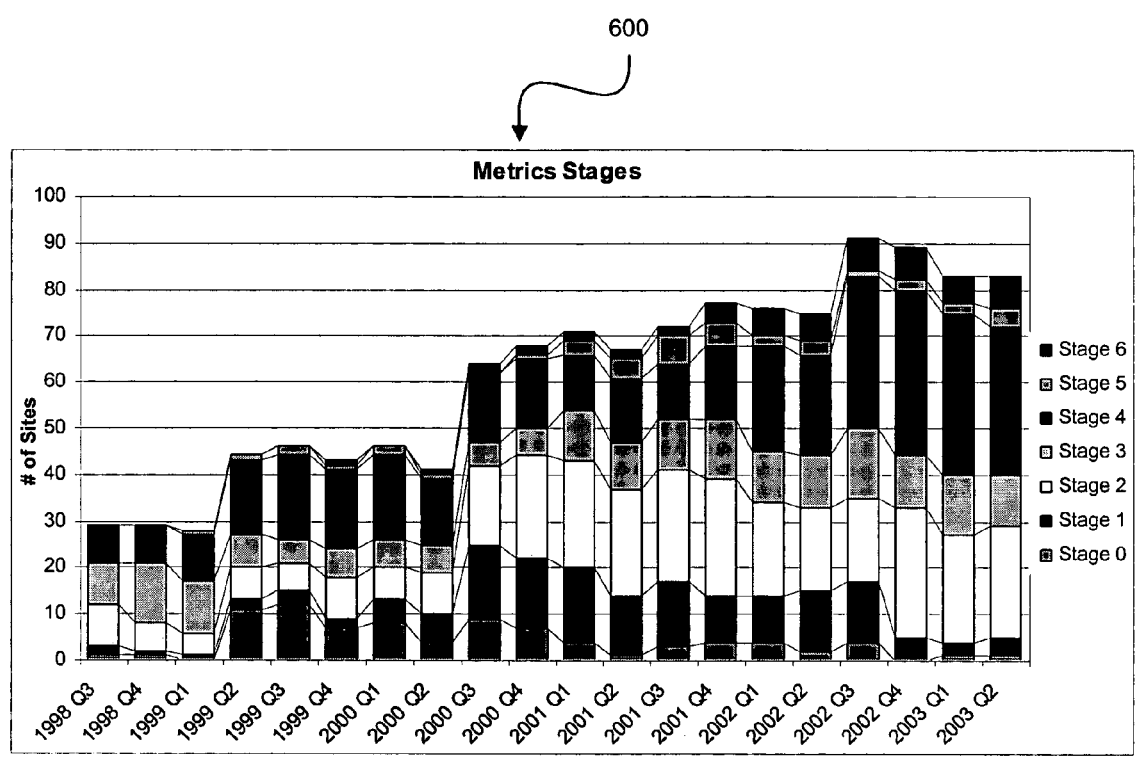
Figure 7:
Figure 8:
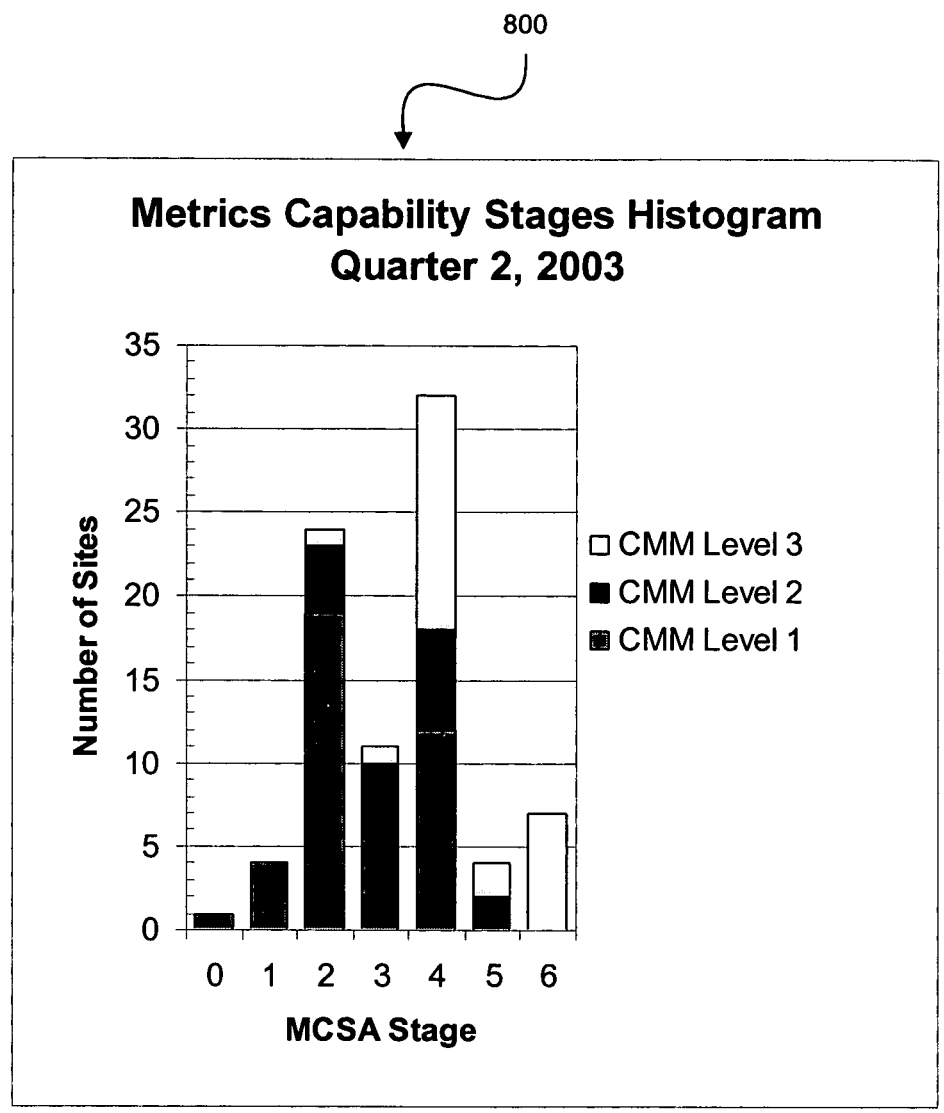
Figure 9:
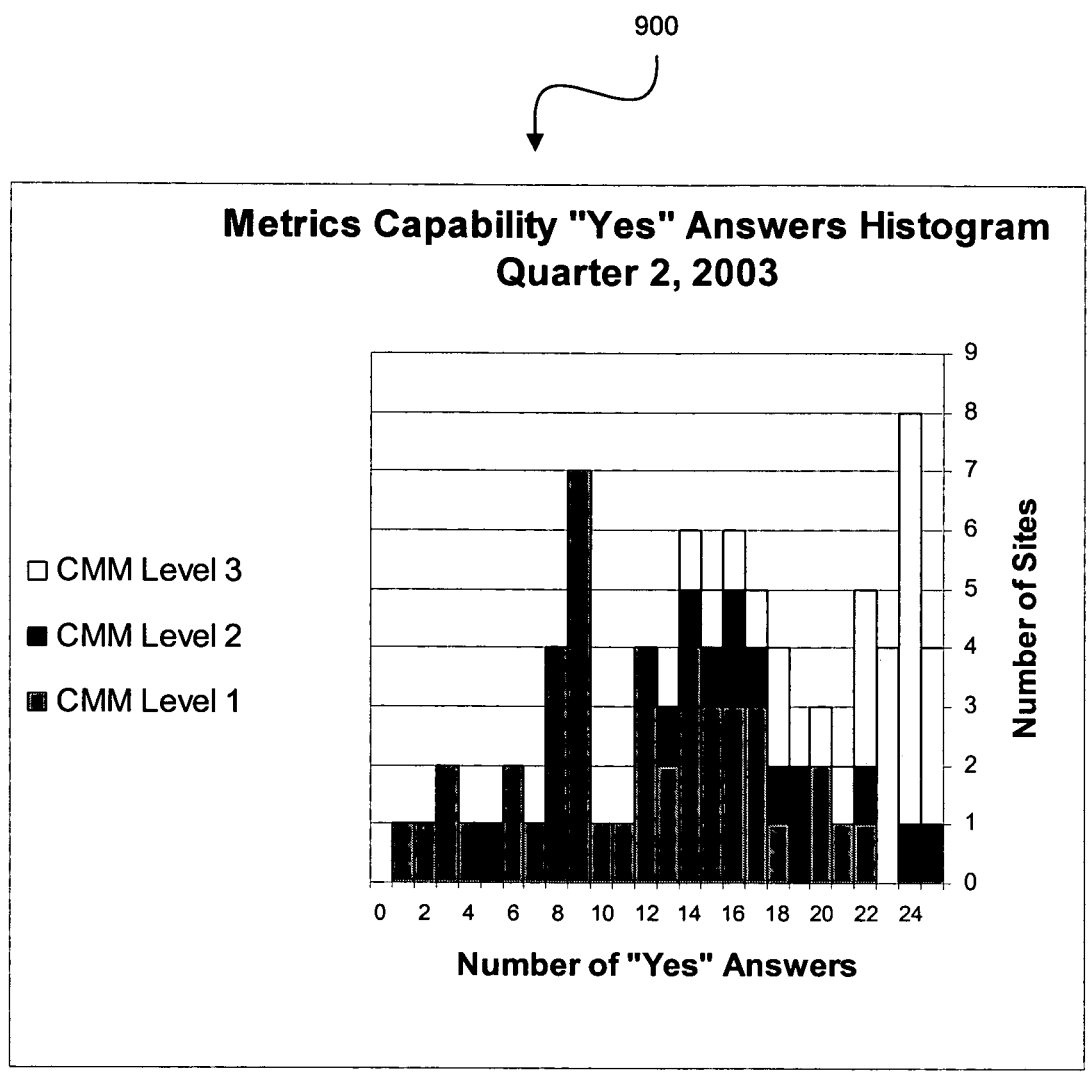

With reference now to FIG. 4B, a diagram illustrating an exemplary process flow and program function for collecting, storing and organizing MCSA data is depicted in accordance with one embodiment of the present invention. The MCSA system collects MCSA question answers for sites and projects within an enterprise, IT, or IS provider (step 432). The MCSA system also collects MCSA scores and stages for locations and projects within the enterprise, IT, or IS provider (step 434). The MCSA system organizes the question answers, MCSA scores and stage scores according to various criteria, such as, for example, project site location, and time period, and stores the information in a database (step 436). The MCSA system creates tables, graphs, and reports based on the MCSA answers and scores as requested defined by the enterprise (step 438). The MCSA system may sporadically receive requests for MCSA information (step 440) and presents the requested information in table, graph, report, or other format, as requested by the user (step 442). In some embodiments, various reports, graphs, or tables may be created automatically by the MCSA system and presented to selected users at certain predefined intervals to encourage continual assessment of metrics implementation and inhibiting user or enterprise failures to study metrics implementation and improvement on a periodic basis, thereby encouraging a systematic approach to improving business functions and thus, increase enterprise profits.

Figure 11:
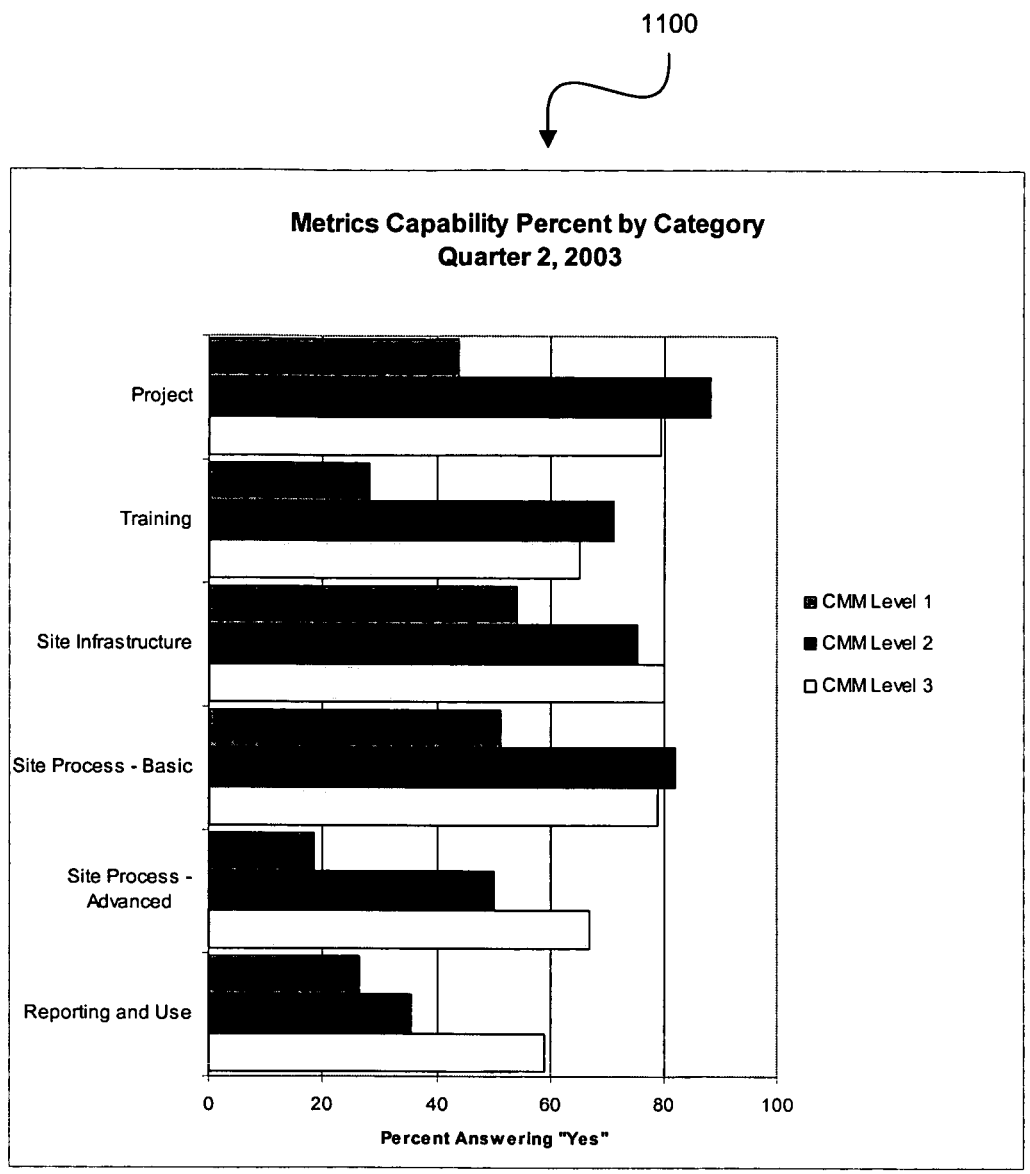
Figure 12:
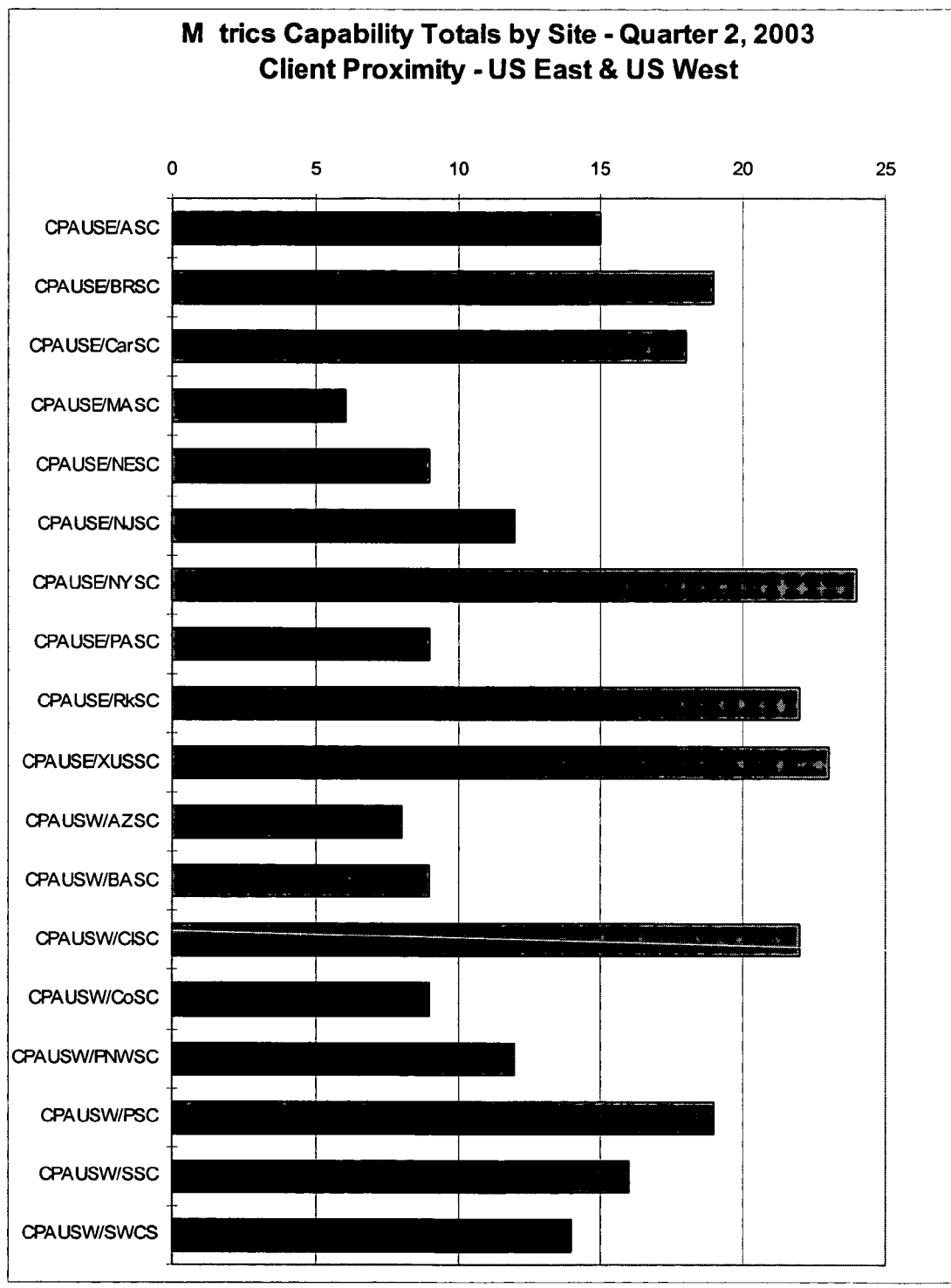

FIGS. 5-12 depict various exemplary tables, graphs, and reports of MCSA data that may be presented to a user to aid an enterprise in determining the metrics capability of the enterprise and implementation of metrics throughout the enterprise. Table 500 in FIG. 5 shows the total yes answers and stage level for a number of sites within an enterprise for several quarters, thereby allowing a user to measure and compare the levels of metrics implementation across the various sites of an enterprise. Graph 600 in FIG. 6 displays a graphical representation of the number of sites within each metrics stage as a function of yearly quarter. Table 700 in FIG. 7 displays metrics capability stage statistics by geography/region for the second quarter of 2003 for an enterprise. Graph 800 in FIG. 8 graphically illustrates the number of sites in each of three Capability Maturity Model (CMM) levels that are in each MCSA stage. CMM was developed by the SEI (Software Engineering Institute). The CMM is a way of assessing the process maturity of software organizations. Graph 900 in FIG. 9 graphically illustrates the number of sites of each CMM level that had a given number of yes answers on the MCSA questionnaire for the $2^{nd}$ Quarter of 2003. Table 1000 in FIG. 10, shows an exemplary table providing the percentage of yes answers to each question for sites in each of levels 1-3. Graph 1100 in FIG. 11 depicts a graphic illustrating percentage of "yes" answers in each section for each CMM level 1-3. Graph 1200 in FIG. 12 depicts metrics capability totals by site for the US East and West geographic region for the second quarter of 2003. These tables, reports, and graphs depicted in FIGS. 5-12 are provided merely as examples of the kind of presentations that may be made of the MCSA data to aid an enterprise, such as an IS provider in conducting a review of its various organizations and to aid in making business decisions. Thus, an enterprise may use the information to provide regular, timely assessment and guidance to locations that are implementing metrics processes. Based on the present invention, an enterprise determines an area (functional grouping) of weakness in its metrics program, creates an improvement plan to address that weakness, and implements the plan—thereby achieving an improved metrics program. With a more mature metrics program, the metrics collected are more reliable and accurate, aiding the future software process improvements, improving estimating, and enabling all levels of management to make decisions based on operational data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for systematically collecting metrics implementation data for use by an enterprise, the method comprising:

determining a set of information sections with a data processing system, the set of information sections to evaluate the degree of implementation of metrics in an organization within the enterprise;

determining a set of questions for each information section with the data processing system, the set of questions for each information section to measure the degree of implementation of metrics within a given one of the set of information sections;

providing a user with the set of questions via the data processing system, the questions being accompanied by text indicating the minimum requirements for a response to at least one of the questions;

receiving responses to the set of questions from the user via the data processing system;

using the responses to plan and change the degree of implementation of metrics in the organization; and submitting the responses to an authorized approver, other than the user, with the data processing system, wherein the responses are submitted to the authorized approver, other than the user, for approval prior to submitting responses to a database of responses.

2. The method as recited in claim 1, further comprising:
prohibiting the user from submitting the responses until all questions have been answered.

3. The method as recited in claim 1, further comprising:
calculating a stage score for the organization submitting the responses, wherein the stage score corresponds to a number of satisfactory answers in the responses and indicates the degree to which metrics have been implemented by the organization during a specified time period.

4. The method as recited in claim 3, further comprising:
adding the information received from the organization to a database of information received from all organizations within the enterprise; and
organizing the database of information by a set of criteria.

5. The method as recited in claim 4, wherein the set of criteria comprise at least one of organization name, organization site location, and time period.

6. The method as recited in claim 4, further comprising:
creating at least one of a report, a table, and a graph from the database of information; and
presenting the at least one of a report, a table, and a graph to a report user.

7. A non-transitory computer readable storage media storing instructions for controlling a data processing system to perform a method of systematically collecting metrics implementation data for use by an enterprise, the computer readable storage media comprising:

first instructions for determining a set of information sections to evaluate the degree of implementation of metrics in an organization within the enterprise, other than metrics to measure software operations and performance;

second instructions for determining a set of questions for each information section which measure the degree of implementation of metrics within a given one of the set of information sections, other than metrics to measure software and performance;

third instructions for providing a user with the set of questions via the data processing system, the questions being accompanied by text indicating the minimum requirements for a response to at least one of the questions;

fourth instructions for receiving responses to the set of questions from the user; and fifth instructions for using the responses to plan and change the degree of implementation of metrics in the organization, other than metrics to measure software operation and performance.

8. The computer program product as recited in claim 7, further comprising:
sixth instructions for prohibiting the user from submitting the responses until all questions have been answered.

9. A non-transitory computer readable storage media storing instructions for controlling a data processing system to perform a method of systematically collecting metrics implementation data for use by an enterprise, the computer readable storage media comprising:

first instructions for determining a set of information sections for evaluating the degree of implementation of metrics in an organization within the enterprise;

second instructions for determining a set of questions for each information section which measures the degree of implementation of metrics within a given one of the set of information sections;

third instructions for providing a user with the set of questions via the data processing system, the questions being accompanied by text indicating the minimum requirements for a response to at least one of the questions;

forth instructions for receiving responses to the set of questions from the user;

fifth instruction for using the responses to plan and change the degree of implementation of metrics in the organization; and sixth instructions for submitting the responses to an authorized approver, other than the user, for approval prior to submitting the responses to a database of responses.

10. The computer program product as recited in claim 7, further comprising:
sixth instructions for calculating a stage score for the organization submitting the responses, wherein the stage score corresponds to a number of satisfactory answers in the responses and indicates the degree to which metrics have been implemented by the organization during a specified time period, other than metrics to measure software operation and performance.

11. The computer program product as recited in claim 10, further comprising:
seventh instructions for adding the information received from the organization to a database of information received from all organizations within the enterprise; and
eighth instructions for organizing the database of information by a set of criteria.

12. The computer program product as recited in claim 11, wherein the set of criteria comprise at least one of organization name, organization site location, and time period.

13. The computer program product as recited in claim 11, further comprising:
ninth instructions for creating at least one of a report, a table, and a graph from the database of information; and
tenth instructions for presenting the at least one of a report, a table, and a graph to a report user.

* * * * *

UNITED STATES PATENT AND TRADEMARK OFFICE
CERTIFICATE OF CORRECTION

PATENT NO.        : 8,595,051 B2                                              Page 1 of 1
APPLICATION NO.   : 10/745989
DATED             : November 26, 2013
INVENTOR(S)       : Paul A. Below et al.

It is certified that error appears in the above-identified patent and that said Letters Patent is hereby corrected as shown below:

In the Claims

In column 17, line 15, in Claim 1, after "submitting" insert -- the --.

In column 17, line 48, in Claim 7, delete "operations" and insert -- operation --, therefor.

In column 17, line 53, in Claim 7, after "software" insert -- operation --.

In column 18, line 18, in Claim 9, delete "measures" and insert -- measure --, therefor.

In column 18, line 25, in Claim 9, delete "forth" and insert -- fourth --, therefor.

In column 18, line 27, in Claim 9, delete "instruction" and insert -- instructions --, therefor.

Signed and Sealed this
Fourth Day of March, 2014

Michelle K. Lee
*Deputy Director of the United States Patent and Trademark Office*